(12) United States Patent
Shimizu (10) Patent No.: US 10,723,101 B2
(45) Date of Patent: Jul. 28, 2020

(54) OPTICAL LAMINATE STRUCTURE AND TOUCH SENSING DEVICE HAVING THE SAME

(71) Applicant: HOSIDEN CORPORATION, Yao-shi, Osaka (JP)

(72) Inventor: Masato Shimizu, Yao (JP)

(73) Assignee: HOSIDEN CORPORATION, Yao-Shi, Osaka (JP)

( * ) Notice: Subject to any disclaimer, the term of this patent is extended or adjusted under 35 U.S.C. 154(b) by 222 days.

(21) Appl. No.: 15/688,615

(22) Filed: Aug. 28, 2017

(65) Prior Publication Data

US 2018/0079933 A1 Mar. 22, 2018

(30) Foreign Application Priority Data

Sep. 16, 2016 (JP) .................................. 2016-181521

(51) Int. Cl.
*B32B 7/06* (2019.01)
*C09J 7/20* (2018.01)
(Continued)

(52) U.S. Cl.
CPC .................. *B32B 7/06* (2013.01); *B32B 3/12* (2013.01); *B32B 3/30* (2013.01); *B32B 7/12* (2013.01);
(Continued)

(58) Field of Classification Search
CPC .... C09J 7/20; G02B 5/30–3058; B32B 27/36; B32B 27/30; B32B 27/08; B32B 7/12; B32B 7/00; B32B 7/06
See application file for complete search history.

(56) References Cited

U.S. PATENT DOCUMENTS

2009/0022967 A1  1/2009 Inenaga
2011/0195240 A1  8/2011 Inenaga
(Continued)

FOREIGN PATENT DOCUMENTS

EP  2341112 A1  7/2011
EP  2869099 A1  5/2015
(Continued)

OTHER PUBLICATIONS

Extended European Search Report for Application No. EP 17020368.1, published by the European Patent Office (EPO), dated Feb. 1, 2018, including corresponding Communication, 1-page Annex, Information on Search Strategy, and 5-page EPO Form 1703.
(Continued)

*Primary Examiner* — Prashant J Khatri
(74) *Attorney, Agent, or Firm* — Kilyk & Bowersox, P.L.L.C.

(57) ABSTRACT

An optical laminate structure including first and second layers each having a bonding face, at least one step on at least one of the bonding faces, a retarder layer between the first and second layers, and first and second adhesive layers. The first layer may cause outgassing. The retarder layer has first and second bonding faces facing the first and second layers, respectively. The first adhesive layer bonds together the bonding face of the first layer and the first bonding face of the retarder layer and has such hardness that suppresses the outgassing at an interface between the first layer and the first adhesive layer. The second adhesive layer bonds together the bonding face of the second layer and the second bonding face of the retarder layer, is more flexible than the first adhesive layer, and has such hardness as to get distorted by the step and thereby absorb height of the step.

26 Claims, 3 Drawing Sheets

(51) Int. Cl.
  *G02B 5/30* (2006.01)
  *B32B 3/30* (2006.01)
  *B32B 27/32* (2006.01)
  *B32B 3/12* (2006.01)
  *B32B 27/30* (2006.01)
  *B32B 27/36* (2006.01)
  *B32B 27/06* (2006.01)
  *B32B 7/12* (2006.01)
  *B32B 27/08* (2006.01)
  *G02F 1/1333* (2006.01)
  *G06F 3/045* (2006.01)

(52) U.S. Cl.
  CPC ............. *B32B 27/06* (2013.01); *B32B 27/08* (2013.01); *B32B 27/30* (2013.01); *B32B 27/308* (2013.01); *B32B 27/325* (2013.01); *B32B 27/36* (2013.01); *B32B 27/365* (2013.01); *C09J 7/20* (2018.01); *G02B 5/3083* (2013.01); *G02F 1/13338* (2013.01); *G06F 3/045* (2013.01); *B32B 2307/412* (2013.01); *B32B 2307/546* (2013.01); *B32B 2307/708* (2013.01); *B32B 2457/20* (2013.01); *B32B 2457/208* (2013.01); *C09J 2201/36* (2013.01); *C09J 2203/318* (2013.01); *G02F 2202/28* (2013.01)

(56) References Cited

U.S. PATENT DOCUMENTS

| | | | |
|---|---|---|---|
| 2012/0062823 A1 | 3/2012 | Takatani et al. | |
| 2013/0295349 A1* | 11/2013 | Yamasaki | G06F 3/0412 428/203 |
| 2014/0092330 A1* | 4/2014 | Oh | G02F 1/133528 349/15 |
| 2014/0240622 A1 | 8/2014 | Watazu et al. | |
| 2015/0036298 A1* | 2/2015 | Kim | B32B 7/12 361/748 |
| 2015/0091873 A1 | 4/2015 | Shimizu | |
| 2015/0212614 A1* | 7/2015 | Chen | G06F 3/044 345/174 |
| 2015/0301385 A1* | 10/2015 | Tsunekawa | G02F 1/13363 349/12 |
| 2015/0346408 A1* | 12/2015 | Mizutani | C09J 133/08 428/41.5 |
| 2016/0185083 A1 | 6/2016 | Yasui et al. | |

FOREIGN PATENT DOCUMENTS

| | | | | |
|---|---|---|---|---|
| JP | 2000111896 A | 4/2000 | | |
| JP | 2012017386 A | 1/2012 | | |
| JP | 2013069072 A | 4/2013 | | |
| JP | 2015030765 A | 2/2015 | | |
| JP | 2015068956 A | 4/2015 | | |
| JP | 2016130747 A | 7/2016 | | |
| WO | 2010044229 A1 | 4/2010 | | |
| WO | WO-2014069378 A1 * | 5/2014 | ......... | G02F 1/13363 |
| WO | WO-2014091863 A1 * | 6/2014 | ......... | H01L 51/5281 |

OTHER PUBLICATIONS

Notification of Reasons for Refusal (Office Action) for Japanese Patent Application No. 2016-181521 issued by the Japan Patent Office (JPO), dated Jan. 28, 2020, including English-language translation, 10 pages.

* cited by examiner

OPTICAL LAMINATE STRUCTURE AND TOUCH SENSING DEVICE HAVING THE SAME

CROSS-REFERENCE TO RELATED APPLICATION

The present application claims priority under 35 U.S.C. § 119 of Japanese Patent Application No. 2016-181521 filed on Sep. 16, 2016, the disclosure of which is expressly incorporated by reference herein in its entirety.

BACKGROUND OF THE INVENTION

Technical Field

The invention relates to optical laminate structures and touch sensing devices having the same.

Background Art

WO 2010/044229 (Document 1) discloses a conventional adhesive sheet for bonding a bonding face of a cover panel to a polarizing film, a touch panel, or other device. The cover panel is made of plastic or other material that may cause outgassing. The bonding face of the cover panel has a step, such as a decorative printed element. The adhesive sheet has outgassing resistance and step-height conformability as specified below. The adhesive sheet includes first and second adhesive layers. The first and second adhesive layers are laminated together and exhibit different viscoelastic behaviors. The first and second adhesive layers are configured such that, when measuring their dynamic shear storage modulus G' (20° C. and 150° C.) with a frequency of 1 Hz and temperature dispersion, the dynamic shear storage modulus G' (20° C. and 150° C.) of the first adhesive layer is within ranges that show flexibility to get distorted yielding and conforming to the step on the bonding face of the cover panel, and the dynamic shear storage modulus G' (20° C. and 150° C.) of the second adhesive layer is within a range that prevent outgassing at the interface between the bonding face of the cover panel and the adhesive sheet. This adhesive sheet, comprised of the bonded first and second adhesive layers, may bring about delamination along the interface of the adhesive layers.

Japanese Unexamined Patent Application Publication No. 2012-17386 (Document 2) discloses a conventional double-sided adhesive tape for bonding a bonding face of a cover panel to an image display device. The cover panel is configured as described above. The double-sided adhesive tape includes a base material having first and second faces, a first adhesive layer, and a second adhesive layer. The first adhesive layer is affixed to the first face of the base material and the bonding face of the cover panel, and the second adhesive layer is affixed to the second face of the base material and the image display device, so that delamination would not occur along the interfaces of the first and second adhesive layers. The double-sided adhesive tape also has outgassing resistance and step-height conformability as specified below. The first adhesive layer has such viscoelasticity that is unlikely to undergo viscous deformation in a high temperature area (80° C.) due to outgassing from the cover panel, making it possible to suppress outgassing at the interface between the bonding face of the cover panel and the first adhesive layer. The first adhesive layer, having outgassing resistance but having such viscoelasticity that is unlikely to undergo viscous deformation, is difficult to yield and conform to the step on the bonding face of the cover panel. However, the second adhesive layer has such viscoelasticity that allows to easily undergo viscous deformation in a high temperature area, so that the double-sided adhesive tape in its entirety exhibits improved flexibility. Improved flexibility of the double-sided adhesive tape in its entirety allows the first adhesive layer to yield and conform to the step on the bonding face of the cover panel.

SUMMARY OF INVENTION

The above cover panels have phase-shift properties. Accordingly, when a user wearing polarized sunglasses views visual information displayed by the image display device through the cover panel, a visibility problem may arise in the image display device. This problem is not considered at all in the device of the Document 1 or 2.

Under the above circumstances, the invention provides an optical laminate structure that has outgassing resistance and step-height conformability and that allows excellent visibility through a polarizing plate, such as polarized sunglasses. The invention also provides a touch sensing device provided with such an optical laminate structure.

The optical laminate structure of one aspect of the invention has enough optical transparency to allow a user to recognize visual information displayed by an image display device through the optical laminate structure. The optical laminate structure includes a first layer, a second layer, at least one step, a retarder layer, a first adhesive layer, and a second adhesive layer. The first layer is made of a material that may cause outgassing and has a bonding face. The second layer has a bonding face. The at least one step is formed or provided on at least one of the bonding faces of the first and second layers. The retarder layer is located between the first layer and the second layer and has a first bonding face facing the first layer and a second bonding face facing the second layer. The first adhesive layer bonds together the bonding face of the first layer and the first bonding face of the retarder layer. The first adhesive layer has such hardness that suppresses the outgassing at an interface between the first layer and the first adhesive layer. The second adhesive layer bonds together the bonding face of the second layer and the second bonding face of the retarder layer, the second adhesive layer being more flexible than the first adhesive layer. The second adhesive layer has such hardness as to get distorted by the step and thereby absorb height of the step.

The optical laminate structure of this aspect has at least the following technical features. First, the first adhesive layer has the hardness as described above, making it possible to suppress outgassing from the first layer in the interface between the first layer and the first adhesive layer. Second, the optical laminate structure has excellent step-height conformability. Specifically, the second adhesive layer has hardness as described above, so that the second adhesive layer may be distorted or dented by the step and may thus absorb the height of the step, i.e. may conform to the contour of the step. Third, since the retarder layer is provided between the first adhesive layer and the second adhesive layer, the optical laminate structure provides favorable visibility when viewed through a polarizing plate.

The first layer may have a retardation value in a range of 0 nm to 3,000 nm. The retarder layer may have a retardation value in a range of 3,000 nm to 30,000 nm.

At least one of the first and second bonding faces of the retarder layer may be surface-treated with plasma or excimer laser beams. The optical laminate structure of this aspect has improved adhesion between the first adhesive layer and the first bonding face of the retarder layer, and/or between the second adhesive layer and the second bonding face of the retarder layer.

The at least one step may be at least one of the following I) to III): I): a protrusion or recess in the bonding face of the first or second layer; II): a printed element on the bonding face of the first or second layer; and III): an electrode on the bonding face of the second layer.

The second layer may be optically isotropic. Alternatively, the second layer may have a slow axis extending in a direction that is substantially equal to a direction of a slow axis of the retarder layer or have a fast axis extending in a direction that is substantially equal to a direction of a fast axis of the retarder layer. The optical laminate structure of this aspect reduces the possibility that linearly polarized light irradiated from the image display device is disturbed when entering the second layer and such disturbed light enters the retarder layer.

The touch sensing device of an aspect of the invention includes an optical laminate structure of any one of the aspects described above.

The at least one step may include an ITO electrode (indium oxide+tin oxide) on the bonding face of the second layer. The second adhesive layer may not contain acrylic acid. In the optical laminate structure of this aspect, the second adhesive layer free of acrylic acid is unlikely to cause corrosion of the ITO electrode.

The second adhesive layer may preferably have a thickness that is larger than the first adhesive layer and that is adapted to get distorted by the step.

BRIEF DESCRIPTION OF DRAWINGS

The present invention can be even more fully understood with the reference to the accompanying drawings which are intended to illustrate, not limit, the present invention.

DESCRIPTION OF EMBODIMENTS

The following describes embodiments and their variants of the invention.

First Embodiment

Figure 1A:
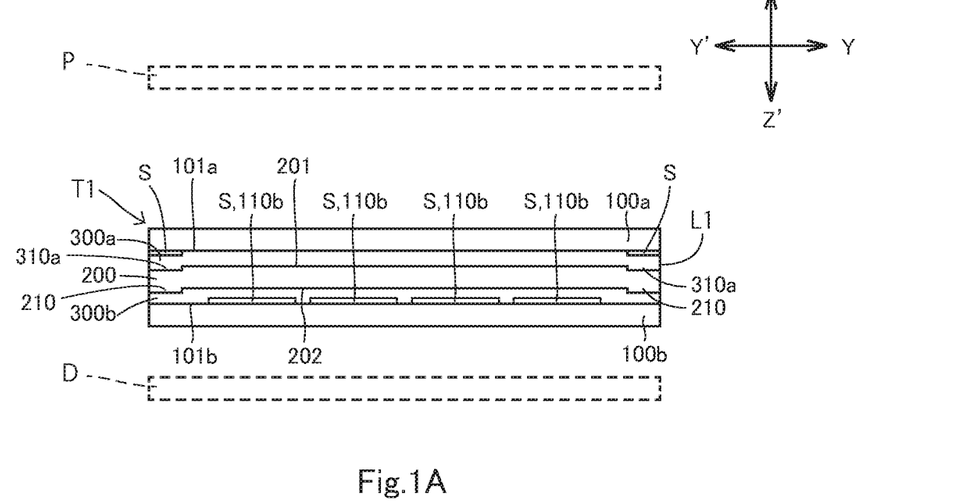
FIG. 1A is a schematic cross-sectional view of a touch sensing device according to the first embodiment of the invention. This view illustrates positional relationships between the touch sensing device, an image display device, and a polarizing plate.
Figure 1B:
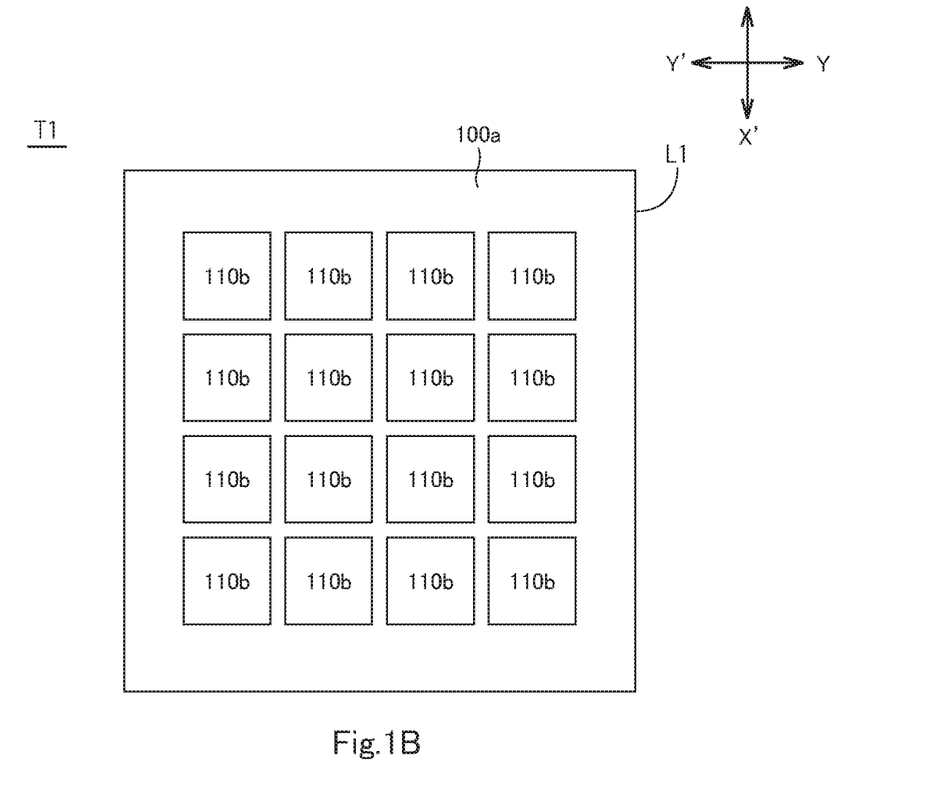
FIG. 1B is a schematic plan view of an optical laminate structure of the touch sensing device.

The following describes a touch sensing device T1 according to various embodiments including the first embodiment of the invention, with reference to FIGS. 1A and 1B. FIGS. 1A and 1B show the touch sensing device T1 according to the first embodiment. The touch sensing device T1 includes an optical laminate structure L1. The optical laminate structure L1 may be disposed on the front side (light emission direction side) of an image display device D, between the image display device D and the eye of the viewer, so that the viewer observes the image display device D through the optical laminate structure L1. A polarizing plate P, such as sunglasses, may be disposed between the optical laminate structure L1 and the eye of the viewer so that the image display device D is observed through the polarizing plate P and the optical laminate structure L1. The image display device D displays visual information (images and text), which can be observed by a viewer either through the polarizing plate P and the optical laminate structure L1, or through only the optical laminate structure L1 without the polarizing plate P. To serve this purpose, the optical laminate structure L1 has enough optical transparency to allow visual information displayed by the image display device D to be visible to the viewer through the optical laminate structure L1 in either case. The optical laminate structure L1 may be partially or entirely transparent. The image display device D may be capable of irradiating linearly polarized light through its light source, such as an LED. Some examples of such image display devices D are liquid crystal displays (LCDs), plasma displays (PDPs), organic electroluminescent displays (OLEDs), and digital light processing (DLP) projectors.

The Z-Z' direction shown in FIG. 1A corresponds to the thickness direction of the optical laminate structure L1. The Z direction corresponds to the direction in which the image display device D emit light (the light emission direction of the image display device D), and the Z' direction corresponds to the direction opposite to the light emission direction. The Y-Y' direction shown in FIGS. 1A and 1B corresponds to the lengthwise direction of the optical laminate structure L1. The Y-Y' direction is orthogonal to the Z-Z' direction. The X-X' direction shown in FIG. 1B corresponds to the widthwise direction of the optical laminate structure L1. The X-X' direction is orthogonal to the Z-Z' and Y-Y' directions.

The optical laminate structure L1 includes a first layer 100a, a second layer 100b, at least one step S, a retarder layer 200, a first adhesive layer 300a, and a second adhesive layer 300b. These components of the optical laminate structure L1 will be described below in detail.

The first layer 100a may be an outermost layer (the outermost layer on the Z direction side in the optical laminate structure L1) of the optical laminate structure L1, such as the cover panel of the touch sensing device T1 as shown in FIG. 1A. Alternatively, the first layer 100a may be an intermediate layer of the optical laminate structure L1. In either case, the first layer 100a may serve as at least one of the following functional layers: a hard coat layer, an antiglare layer, an antireflection layer, a low reflection layer, an electrode base layer, a protective layer, an anti-Newton layer, a strength retaining layer, and/or a stain-proof layer, etc. It is of course possible that the first layer 100a serves as a cover panel and also as at least one of the aforementioned functional layers. The first layer 100a is made of plastic or like material that may cause outgassing and that has enough optical transparency to allow a user to recognize visual information displayed by the image display device D through the first layer 100a. For example, the first layer 100a may be made of polycarbonate (PC), polymethyl methacrylate (PMMA), or the like. The first layer 100a may be partially or entirely transparent. The first layer 100a has an outer shape and size that may be the same as, or larger than, that of the second layer 100b. The first layer 100a may be formed by extrusion molding, coextrusion molding, or injection molding or any other suitable process.

The first layer 100a may have a retardation value in a range of 0 nm to 3,000 nm, but not limited thereto. The first layer 100a may be optically isotropic. Alternatively, the first layer 100a may have a slow axis extending in a constant direction (e.g. the same as the slow axis direction of the retarder layer 200) and/or may have slow axes extending in any directions (i.e. randomly extending in the plane). Likewise, the first layer 100a may have a fast axis extending in a constant direction (e.g. the same as the fast axis direction of the retarder layer 200), or may have fast axes extending in any directions (i.e. randomly extending in the plane). The first layer 100a has a bonding face 101a facing the second layer 100b (facing in the Z' direction).

The second layer 100b is located on the Z' direction side relative to the first layer 100a. The second layer 100b is made of plastic or like material that has enough optical transparency to allow a user to recognize visual information displayed by the image display device D through the second layer 100b. For example, the second layer 100b may be made of polycarbonate (PC), cycloolefin polymer (COP), polyethylene terephthalate (PET), glass, or the like material. The second layer 100b may be partially or entirely transparent.

The second layer 100b may be optically isotropic. Alternatively, the second layer 100b may have a slow axis extending in the same direction as the slow axis direction of the retarder layer 200, and/or may have a fast axis extending in same direction as the fast axis direction of the retarder layer 200. The second layer 100b has a bonding face 101b facing the first layer 100a (facing in the Z direction).

The at least one step S is on at least one of the bonding face 101a of the first layer 100a and the bonding face 101b of the second layer 100b. The at least one step S may specifically have at least one of the following configurations I), II), and III).

Configuration I): The or each step S is a protrusion or recess on the bonding face 101a or 101b. For example, the step S may results from the difference between the highest point (peak) and the lowest point (valley) (protrusion and/or recess) of the surface irregularities (projections and depressions) of the bonding face 101a or 101b. Alternatively, the or each step S may be a protrusion or recess on the bonding face 101a or 101b that are provided intentionally for ornamental and/or functional purposes in the design of the touch sensing device T1.

Configuration II): The or each step S is a printed element on the bonding face 101a or 101b. For example, the printed element is decorative printing or the like on the bonding face 101a or 101b.

Configuration III): The or each step S is an electrode on the bonding face 101b of the second layer 100b. In this case, the second layer 100b serves as an electrode base layer. The electrode or electrodes will be hereinafter referred to, not as the step S, as electrode or electrodes 110b for convenience of description.

The at least one electrode 110b may be configured for detecting a detection target, such as a finger or a conductor of a stylus, approaching to the outermost layer of the optical laminate structure L1, adapted to A) a surface capacitive sensing or B) a projected capacitive sensing.

In case A), a single electrodes 110b being a transparent conductive film is provided. The transparent conductive film is made of a material such as ITO (indium oxide+tin oxide) or ATO (antimony tin oxide). Also, electric field values at the four corners of the or each electrode 110b change in accordance with the approach of the detection target to the outermost layer.

In case B), the one or more electrodes 110b are designed for either B1) a self capacitance sensing or B2) a mutual capacitance sensing. In either case, the one or more electrodes 110b are made of a transparent conductive film or a conductor. The transparent conductive film may be made of a material such as tin-doped indium oxide (ITO), carbon nanotubes (CNT), indium-doped zinc oxide (IZO), aluminum-doped zinc oxide (AZO), or conductive polymer such as PEDOT and PSS. The conductor may specifically be photosensitive silver, silver nanoink, silver nanowires, vapor-deposited copper, rolled copper, copper nanoink, etc.

In the case of type B1, the one or more electrode 110b are configured such that when a detection target approaches the electrode 110b or one of the electrodes 110b, there will be a change in electrostatic capacitance generated between the approached electrode 110b and the detection target. The change in electrostatic capacitance changes an electric signal (voltage or current) from the approached electrode 110b. If a plurality of electrodes 110b is provided, they may preferably be spaced apart from each other on the bonding face 101b of the second layer 100b (see FIG. 1B).

In the case of type B2, a plurality of electrodes 110b are spaced apart from each other on the bonding face 101b of the second layer 100b. Two adjacent electrodes 110b form a pair, one of which serves as a drive electrode, and the other of which serves as a detection electrode (sensor electrode). For example, as shown in FIG. 1B, the electrodes 110b may be arranged in four horizontal rows, in which the electrodes 110b in the first and third rows may serve as drive electrodes, and the electrodes 110b in the second and fourth rows may serve as detection electrodes. Alternatively, the electrodes 110b in the first and third rows may serve as detection electrodes, and the electrodes 110b in the second and fourth rows may serve as drive electrodes. Each two adjacent electrodes, namely drive and detection electrodes, are electrostatically coupled to each other. When a detection target approaches at least one pair of adjacent drive and detection electrodes, there will be a change in electrostatic capacitance generated between the drive and detection electrodes. The change in electrostatic capacitance changes an electric signal (voltage or current) from the detection electrode.

The retarder layer 200 is a film or plate disposed between the first layer 100a and the second layer 100b. The retarder layer 200 is made of a material having enough optical transparency to allow a user to recognize visual information displayed by the image display device D through the retarder layer 200. The retarder layer 200 may be partially or entirely transparent. The retarder layer 200 may be flexible as described below or may be rigid. The thickness (Z-Z' direction dimension) of the retarder layer 200 may fall within a range of 80 μm to 300 μm.

The retarder layer 200 has a larger retardation value than the first layer 100a. For example, the retarder layer 200 may have a retardation value in the range of 3,000 nm to 30,000 nm or a retardation value of 30,000 nm or more. The slow axis of the retarder layer 200 may preferably extend at an angle of 30 to 60 degrees to the polarization axis or the absorption axis of the image display device D. The retarder layer 200 serves to convert linearly polarized light irradiated from the image display device D into circularly polarized light (including elliptically polarized light). Generally speaking, the amount of linearly polarized light passing through a polarizing plate P varies depending on the axial relationship between the polarizing plate P and linearly polarized light, but the amount of circularly polarized light passing through a polarizing plate P does not vary. The retarder layer 200 accordingly improves the visibility of information displayed by the image display device D through the polarizing plate P. The glass transition temperature (Tg) of the retarder layer 200 may fall within a range from −40° C. to 95° C. (environmental temperatures for automobile use) or within a range from −10° C. to 60° C. (environmental temperatures for consumer use) or more.

The retarder layer 200 has a first bonding face 201 facing the first layer 100a (in the Z direction) and a second bonding face 202 facing the second layer 100b (in the Z' direction). At least one of the first and second bonding faces 201 and 202 may or may not be surface-treated with plasma or excimer laser beams.

The first adhesive layer 300a bonds together the bonding face 101a of the first layer 100a and the first bonding face 201 of the retarder layer 200. The first adhesive layer 300a may specifically be an adhesive agent, an adhesive tape, such as optically clear adhesive (OCA, registered trademark), and the like. The first adhesive layer 300a is made of a material having enough optical transparency to allow a user to recognize visual information displayed by the image display device D through the first adhesive layer 300a. The first adhesive layer 300a may be optically transparent. The first adhesive layer 300a has outgassing resistance, i.e. has enough hardness to suppress outgas sing from the first layer 100a at the interface between the bonding face 101a of the first layer 100a and the first adhesive layer 300a. For example, in order to suppress outgassing from the first layer 100a at the interface between the bonding face 101a of the first layer 100a and the first adhesive layer 300a, the first adhesive layer 300a may preferably have a storage modulus of either 1) and 2) as follows, but is not limited thereto.

1) storage modulus=1 to $10 \times 10^5$ Pa (at 25° C.)
2) storage modulus=0.5 to $5 \times 10^5$ Pa (at 80° C.)

If at least one step S is provided on the bonding face 101a of the first layer 100a, the first adhesive layer 300a is warped partially, at the portion in contact with the or each step S, so as to protrude toward the second adhesive layer 300b. The or each warped portion of the first adhesive layer 300a will be referred to as a protrusion 310a. The or each protrusion 310a has a Z-Z' direction dimension that is 1) smaller than, or 2) approximately the same as, that of the step S. In case 1), the first adhesive layer 300a gets distorted/dented yielding and conforming to the step S and partially absorbs the height of the step S. In case 2), the protrusion 310a protrudes in the Z' direction, toward the second adhesive layer 300b, by the Z-Z' direction dimension of the step S, and the first adhesive layer 300a does not get distorted/dented conforming to the step S, i.e. does not absorb the height of the step S. The retarder layer 200 is warped partially, at the portion in contact with the or each protrusion 310a, so as to protrude toward the second adhesive layer 300b. The or each warped portion of the retarder layer 200 will be referred to as a protrusion 210. The or each protrusion 210 has a Z-Z' direction dimension that is 3) smaller than, or 4) approximately the same as, that of the protrusion 310a. In case 3), the retarder layer 200 gets distorted/dented yielding and conforming to the protrusion 310a and partially absorbs the height of the protrusion 310a. In case 4), the protrusion 210 protrudes in the Z' direction, toward the second adhesive layer 300b, by the Z-Z' direction dimension of the protrusion 310a, and the retarder layer 200 does not does not get distorted/dented yielding and conforming to the protrusion 310a, i.e. does not absorb the height of the step S. It should be noted that when the at least one step S is present only on the bonding face 101b of the second layer 100b, the first adhesive layer 300a does not have any protrusions 310a, and the retarder layer 200 does not have any protrusions 210, either.

In addition, the first adhesive layer 300a may have a thickness (Z-Z' direction dimension) that falls within a range of 25 to 175 μm. The first adhesive layer 300a may have a very low retardation value, i.e. the layer may completely or nearly isotropic. For example, the retardation value of the first adhesive layer 300a may fall within a range of 0 to 50 nm. Alternatively, the first adhesive layer 300a may have a retardation value higher than this value range. In this case, the first adhesive layer 300a may preferably, but not limited thereto, have a slow axis extending in the same direction to that of the retarder layer 200, or have a fast axis extending in the same direction to that of the retarder layer 200. The second adhesive layer 300b bonds together the bonding face 101b of the second layer 100b and the second bonding face 202 of the retarder layer 200. The second adhesive layer 300b may specifically be an adhesive or an adhesive, such as optically clear adhesive (OCA, registered trademark) and the like. The second adhesive layer 300b is made of a material having enough optical transparency to allow a user to recognize visual information displayed by the image display device D through the second adhesive layer 300b. The second adhesive layer 300b may be optically transparent. The second adhesive layer 300b is more flexible than the first adhesive layer 300a. Specifically, the second adhesive layer 300b has such a hardness (step-height conformability) as to get distorted/dented yielding and conforming to the at least one protrusion 210 on the retarder layer 200 and/or the at least one step S on the second layer 100b and thereby absorb the height of the or each protrusion 210 of the retarder layer 200 and/or the height of the or each step S on the second layer 100b. In other words the second adhesive layer deforms during the lamination process to conform to the at least one protrusion 210 on the retarder layer 200 and/or the at least one step S on the second layer 100b. For example, in order to be able to get distorted/dented yielding and conforming to the at least one protrusion 210 and/or the at least one step S, the second adhesive layer 300b may preferably have a storage modulus of either 1) and 2) as follows, but is not limited thereto.

1) Second adhesive layer: storage modulus=1 to $20 \times 10^4$ Pa (at 25° C.)
2) Second adhesive layer: storage modulus=1 to $10 \times 10^4$ Pa (at 80° C.)

[Also, the second adhesive layer 300b may preferably have a larger thickness (Z-Z' direction dimension) than the first adhesive layer 300a and get distorted yielding and conforming to the shape of at least one protrusion 210 of the retarder layer 200 and/or the at least one step S on the second layer 100b. For example, the thickness of the second adhesive layer 300b may fall within a range of 50 to 500 μm. The first and/or second adhesive layer may have a thickness greater than the height of the step in the bonding face it contacts, in order to absorb the height of the step.

The second adhesive layer 300b may have a very low retardation value, i.e. the layer may completely or nearly isotropic. For example, the retardation value of the second adhesive layer 300b may fall within a range of 0 to 50 nm. Alternatively, the second adhesive layer 300b may have a retardation value higher than this value range. In this case, the second adhesive layer 300b may preferably, but not limited thereto, have a slow axis direction that is identical to that of the retarder layer 200, or have a fast axis direction that is identical to that of the retarder layer 200.

When the or each step S on the second layer 100*b* (electrode 110*b*) is an ITO electrode as described above, the second adhesive layer 300*b* may preferably be of a material that does not contain acrylic. That is, if the or each step S on the second layer 100*b* (electrode 110*b*) is an electrode other than an ITO electrode or the above-described elements I) or II), the second adhesive layer 300*b* may contain acrylic acid.

The touch sensing device T1 and the optical laminate structure L1 as described above has at least the following technical features. First, the touch sensing device T1 and the optical laminate structure L1 is so configured as to provide favorable visibility when viewed through them. Specifically, i) the first adhesive layer 300*a* has the hardness as described above. If undesirable outgas sing from the first layer 100*a* occurs at the interface between the first layer 100*a* and the first adhesive layer 300*a*, the gas may expand into bubbles at the interface, causing degradation in visibility of the touch sensing device T1 and the optical laminate structure L1. However, the first adhesive layer 300*a* of the above described hardness suppresses outgassing and thereby contributes to favorable visibility of the touch sensing device T1 and the optical laminate structure L1. ii) The second adhesive layer 300*b* has the hardness as described above, so that the second adhesive layer 300*b* gets distorted/dented following the shape of the or each protrusion 210 of the retarder layer 200 of the second layer 100*b* (i.e., the or each step S on the first layer 100*a*) and/or the or each step S on the second layer 100*b* to absorb the height of the or each step. In other words the second adhesive layer conforms to the contour of the or each protrusion 210 of the retarder layer 200 of the second layer 100*b* (i.e., the or each step S on the first layer 100*a*) and/or to the contour of the at least one step S on the second layer 100*b*. This configuration suppresses formation of bubbles into the boundary between the or each step S on the first layer 100*a* and the first adhesive layer 300*a* and/or into the boundary between the or each step S on the second layer 100*b* and the second adhesive layer 300*b*. Bubbles in such boundary would cause degradation in transparency of the touch sensing device T1 and the optical laminate structure L1. However, the second adhesive layer 300*b* of the above described hardness suppresses formation of bubbles and thereby contributes to favorable transparency of the touch sensing device T1 and the optical laminate structure L1. iii) The retarder layer 200, interposed between the first adhesive layer 300*a* and the second adhesive layer 300*b*, also contributes to favorable visibility through the touch sensing device T1 and the optical laminate structure L1 when viewed through a polarizing plate P. If the second layer 100*b* and/or the second adhesive layer 300*b* have has phase-shift properties, linearly polarized light irradiated from an image display device D may be disturbed when entering the second layer 100*b* and/or the second adhesive layer 300*b*. However, if the second layer 100*b* and/or the second adhesive layer 300*b* are optically isotropic, or if the second layer 100*b* and/or the second adhesive layer 300*b* has a slow axis or a fast axis extending in the same directions as those of the retarder layer 200, the possibility is reduced that linearly polarized light irradiated from the image display device is disturbed when entering the second layer 100*b* and/or the second adhesive layer 300*b* and such disturbed light enters the retarder layer 200. Therefore, light passing through the touch sensing device T1 and the optical laminate structure L1 is linearly polarized light properly in the correct orientation, which will be properly converted into circularly polarized light. Hence, favorable visibility will be obtained even when viewed through the polarizing plate P.

Second, delamination is unlikely to occur in the touch sensing device T1 and the optical laminate structure L1 for the following reasons. Generally speaking, if the bonding face 101*a* of the first layer 100*a* and the bonding face 101*b* of the second layer 100*b* are bonded together with an adhesive layer laminate including an adhesive layer having outgassing resistance and another adhesive layer having high step-height conformability, delamination is likely to occur between the two adhesive layers due to their low affinity. This is in contrast with the touch sensing device T1 and the optical laminate structure L1, wherein the first adhesive layer 300*a* bonds the first layer 100*a* and the retarder layer 200 together, and the second adhesive layer 300*b* bonds the second layer 100*b* and the retarder layer 200 together, delamination is unlikely to occur along the interface between each of the layers. In particular, if at least one of the first bonding face 201 and the second bonding face 202 of the retarder layer 200 is surface-treated with plasma or excimer laser beams, such treatment improves adhesion in the corresponding bonding part, i.e. the bonding part of the retarder layer 200 and the first adhesive layer 300*a*, and the bonding part of the retarder layer 200 and the second adhesive layer 300*b*.

Third, warpage is unlikely to occur in the optical laminate structure L1 for the following reasons. The optical laminate structure L1 includes two adhesive layers, namely the first adhesive layer 300*a* and the second adhesive layer 300*b*, so that the total thickness of the adhesive layers is increased. In addition, the second adhesive layer 300*b* has high flexibility. Therefore, even if the first layer 100*a* and the second layer 100*b* thermally expand to different degrees due to their difference in thermal expansion coefficient, the difference in thermal expansion will be absorbed by the first adhesive layer 300*a* and the second adhesive layer 300*b*. In this case, the retarder layer 200 may preferably be a flexible film. Further advantageously, the reduced warpage in the optical laminate structure L1 contributes to reduced warping stress in the optical laminate structure L1 that would otherwise cause delamination at each interface of the first layer 100*a*, the first adhesive layer 300*a*, the retarder layer 200, the second adhesive layer 300*b*, and the second layer 100*b* of the optical laminate structure L1.

Fourth, if an ITO electrode is provided as a step S on the second layer 200*b* and if the second adhesive layer 300*b* does not contain acrylic acid, the ITO electrode will not corrode on the on the second layer 200*b* free of acrylic acid.

Fifth, the touch sensing device T1 and the optical laminate structure L1 can be manufactured with reduced costs. This is because the retarder layer 200 is interposed between the first adhesive layer 300*a* and the second adhesive layer 300*b* as described above. Therefore, there is no need to additionally provide a retarder layer for the purpose of improved visibility as viewed through a polarizing plate P.

Second Embodiment

Figure 2A:
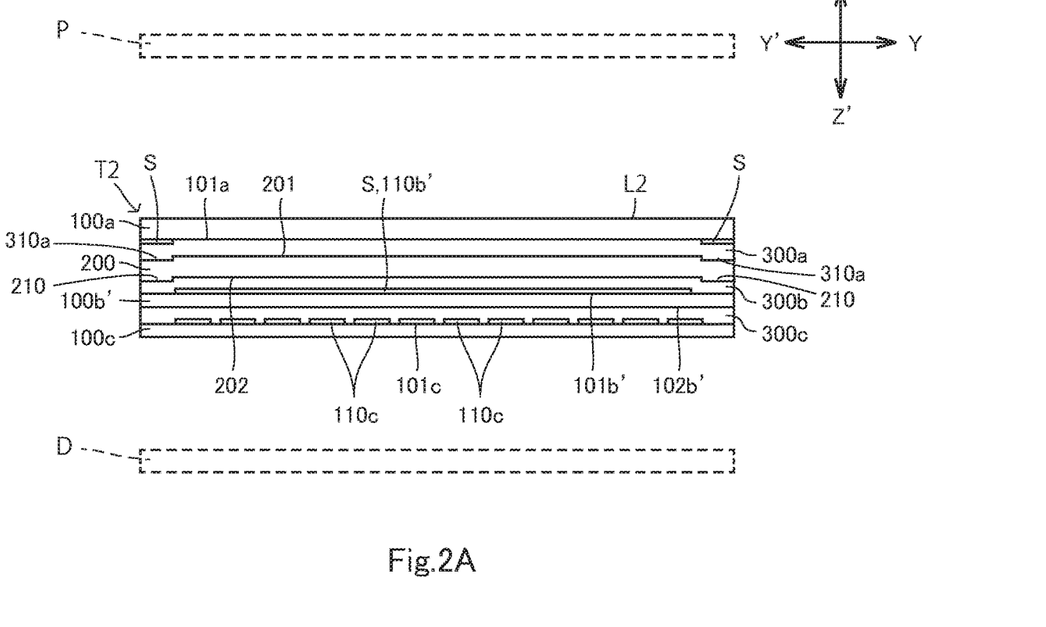
FIG. 2A is a schematic cross-sectional view of a touch sensing device according to the second embodiment of the invention. This view illustrates positional relationships between the touch sensing device, an image display device, and a polarizing plate.
Figure 2B:
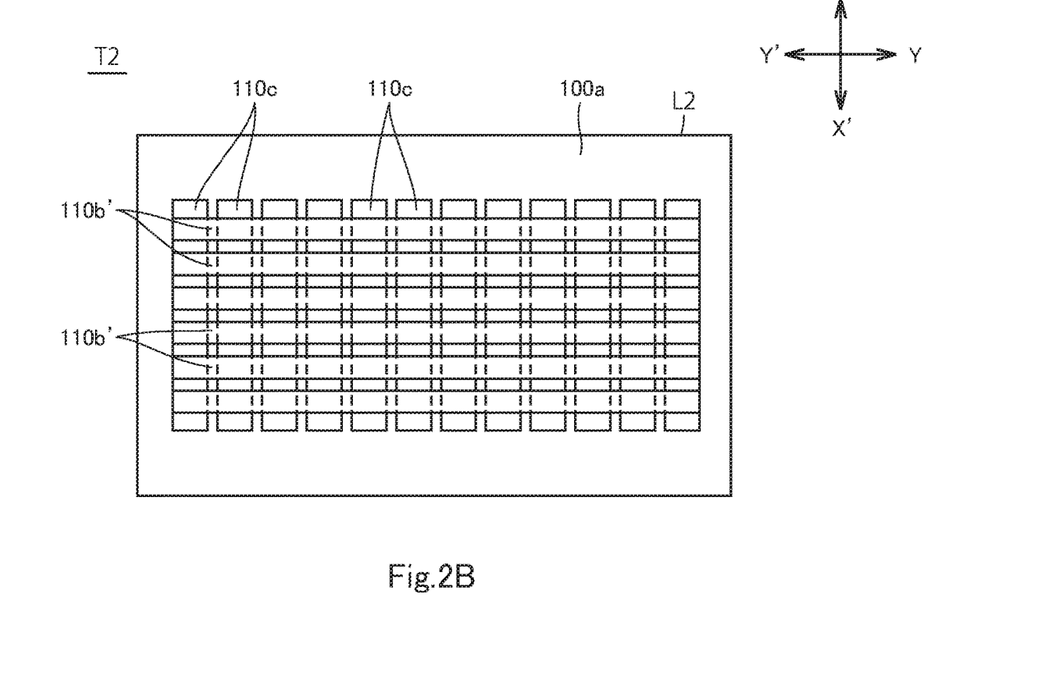
FIG. 2B is a schematic plan view of an optical laminate structure of the touch sensing device.

The following describes a touch sensing device T2 according to various embodiments including the second embodiment and its variants of the invention, with reference to FIGS. 2A and 2B. FIGS. 2A and 2B show the touch sensing device T2 according to the second embodiment. FIG. 2A also shows in phantom lines the polarizing plate P and the display device D, in a manner similar to FIG. 1A. The display device D may be viewed through only the touch sensing device T2, or may be viewed through the touch sensing device T2 and the polarizing plate P, as described in relation to the previous embodiment. The touch sensing device T2 is sufficiently transparent that the information on the display device D is visible to the viewer in either case. The touch sensing device T2 includes an optical laminate structure L2. The touch sensing device T2 has the same configuration as the touch sensing device T1, except the following differences 1 to 3. Difference 1): The optical laminate structure L2 includes a second layer 100$b'$ of a different configuration from that of the second layer 100$b$ of the optical laminate structure L1. Difference 2): The optical laminate structure L2 further includes a third layer 100$c$ and a third adhesive layer 300$c$, in addition to the first layer 100$a$, the second layer 100$b'$, the at least one step S, the retarder layer 200, the first adhesive layer 300$a$, and the second adhesive layer 300$b$. Difference 3): The or each step S on the second layer 100$b'$ has a different from configuration from that of the or each step S on the second layer 100$b$ of the optical laminate structure L1. These differences will be described in detail, without repeating descriptions on the touch sensing device T2 that overlap with those of the touch sensing device T1. It should be noted that FIG. 2A shows the Z-Z' and Y-Y' directions in a similar manner to FIG. 1A, and that FIG. 2B shows the Y-Y' and X-X' directions in a similar manner to FIG. 1B. The Z-Z', Y-Y', and X-X' directions are defined as described for the first embodiment.

The third layer 100$c$ is an electrode base layer arranged on the Z' direction side relative to the second layer 100$b$. The third layer 100$c$ is made of a plastic material or the like that has enough optical transparency to allow a user to recognize visual information displayed by the image display device D through the third layer 100$c$. For example, the third layer 100$c$ may be made of polycarbonate (PC), cycloolefin polymer (COP), polyethylene terephthalate (PET), glass, or the like material. The third layer 100$c$ may be partially or entirely transparent. The third layer 100$c$ may be optically isotropic, or alternatively the third layer 100$c$ may have a slow axis extending in the same direction as the slow axis direction of the retarder layer 200 or a fast axis extending in the same direction as the fast axis direction of the retarder layer 200.

The third layer 100$c$ has a bonding face 101$c$ facing the second layer 100$b$ (facing in the Z direction). On the bonding face 101$c$ of the third layer 100$c$, a plurality of electrodes 110$c$ is arranged in spaced relation to each other in the Y-Y' direction. The electrodes 110$c$ extend in the X-X' direction. It should be noted that on the bonding face 101$c$ of the third layer 100$c$, there may also be at least one step, which or each of which may be an electrode 110$c$ or may have the same configuration as that of the at least one step S on the second layer 100$b'$.

The second layer 100$b'$ has the same configuration as that of the second layer 100$b$, except that the second layer 100$b'$ further includes a bonding face 102$b'$. The bonding face 102$b'$ of the second layer 100$b'$ faces the third layer 100$c$, i.e., faces in the Z' direction.

The at least one step S of the optical laminate structure L2 is provided on the bonding face 101$a$ of the first layer 100$a$ and/or on the bonding face 101$b'$ of the second layer 100$b'$. The step S may be at least one of the following configurations I), II), and III). Configuration I): The or each step S of the optical laminate structure L2 has the same configuration as Configuration I) of the or each step S of the optical laminate structure L1. Configuration II): The or each step S of the optical laminate structure L2 has the same configuration as Configuration II) of the or each step S of the optical laminate structure L1.

Configuration III): The at least one step S on the second layer 100$b'$ of the optical laminate structure L2 is a plurality of electrodes arranged in spaced relation to each other in the X-X' direction on the bonding face 101$b'$ of the second layer 100$b'$. The electrodes extend in the Y-Y' direction. The electrodes will be hereinafter referred to, not as the step S, as electrode or electrodes 110$b'$ for convenience of description. The second layer 100$b'$, having the electrodes 110$b'$ thereon, serves as an electrode base layer.

The electrodes 110$b'$ and the electrodes 110$c$ adapted to a mutual capacitive sensing. The electrodes 110$b'$ cross the electrodes 110$c$ at right angles or at other angles, at a different height level in the Z-Z' direction from the electrodes 110$c$. The electrodes 110$b'$ may be drive electrodes and the electrodes 110$c$ may be detection electrodes (sensor electrodes). Alternatively, the electrodes 110$b'$ may be are detection electrodes (sensor electrodes) and the electrodes 110$c$ may be drive electrodes. The electrodes 110$b'$ and 110$c$ are transparent conductive films or conductors. Specifically, the transparent conductive films may be made of a material such as tin-doped indium oxide (ITO), carbon nanotubes (CNT), indium-doped zinc oxide (IZO), aluminum-doped zinc oxide (AZO), or conductive polymer such as PEDOT and PSS. The conductors may specifically be photosensitive silver, metal (for example, Ag or Cu) with a line width of 15 μm or less formed by graph offset or other method, silver nanoink, silver nanowires, metal wires, vapor deposited copper, rolled copper, copper nanoink, or the like. Each drive electrode is electrostatically coupled to a respective detection electrode crossing the drive electrode. Accordingly, when a detection target approaches at least one pair of intersecting drive and detection electrodes, there is a change in electrostatic capacitance between the drive and detection electrodes, and the change in the electrostatic capacitance changes the electric signal from the detection electrode (voltage or current). It should be noted that the electrodes 110$b'$ and 110$c$ may be rhombic electrodes and may be adapted to a self capacitance sensing.

The third adhesive layer 300$c$ be of any configuration that is capable of bonding together the bonding face 102$b'$ of the second layer 100$b$ and the bonding face 101$c$ of the third layer 100$c$. The third adhesive layer 300$c$ may have the same configuration as the second adhesive layer 300$b$. In this case, the third adhesive layer 300$c$ has such a hardness (step-height conformability) as to get distorted/dented yielding and conforming to the at least one step, such as the electrodes 110$c$, on the third layer 100$c$.

It should be noted that the third layer 100$c$ and the third adhesive layer 300$c$ may be omitted. In this case, the electrodes 110$c$ may preferably be provided on the bonding face 102$b'$ of the second layer 100$b'$, not on the bonding face 101$c$ of the third layer 100$c$ so as to be spaced apart from each other in the Y-Y' direction. Except this modification, the electrodes 110$c$ are configured as described above.

The touch sensing device T2 and the optical laminate structure L2 configured as described above have various technical features, at least ones similar to the first to fifth technical features of the touch sensing device T1 and the optical laminate structure L1.

Third Embodiment

Figure 3:
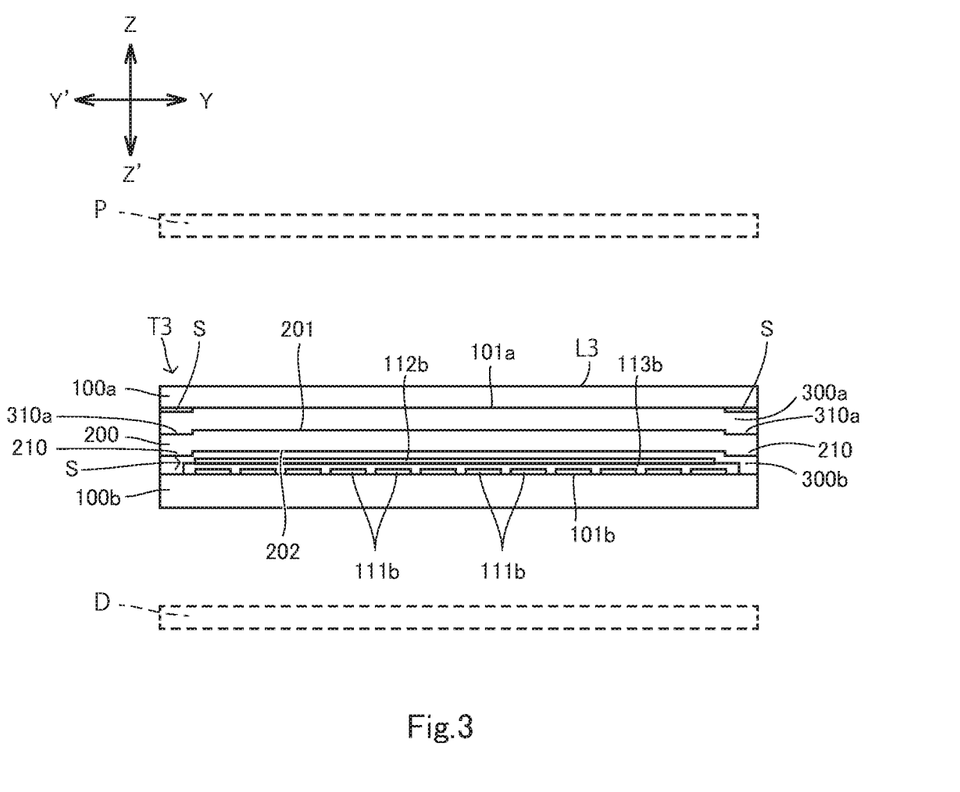
FIG. 3 is a schematic cross-sectional view of a touch sensing device according to the third embodiment of the invention. This view illustrates positional relationships between the touch sensing device, an image display device, and a polarizing plate.

The following describes a touch sensing device T3 according to various embodiments including the third embodiment of the invention, with reference to FIG. 3. FIG. 3 shows the touch sensing device T3 according to the third embodiment. FIG. 3 also shows in phantom lines the polarizing plate P and the display device D, in a manner similar to FIGS. 1A and 2A. The display device D may be viewed through only the touch sensing device T3, or may be viewed through the touch sensing device T3 and the polarizing plate P, as described in relation to the previous embodiments. The touch sensing device T3 is sufficiently transparent that the information on the display device D is visible to the viewer in either case. The touch sensing device T3 includes an optical laminate structure L3. The touch sensing device T3 has the same configuration as the touch sensing device T1, except that the second layer 100b of the optical laminate structure L3 has at least one step S which or each of which has a different configuration from that of the or each step S on the second layer 100b of the optical laminate structure L1. This difference will be described in detail, without repeating descriptions on the touch sensing device T3 that overlap with those of the touch sensing device T1. It should be noted that FIG. 3 shows the Z-Z' and Y-Y' directions in a similar manner to FIG. 1A. There is no figure showing the X-X' direction for this embodiment, the Z-Z', Y-Y', and X-X' directions are defined as described for the first embodiment.

The at least one step S of the optical laminate structure L3 is provided on the bonding face 101a of the first layer 100a and/or on the bonding face 101b of the second layer 100b. The step S may be at least one of the following configurations I), II), and III). Configuration I): The or each step S of the optical laminate structure L3 has the same configuration as Configuration I) of the or each step S of the optical laminate structure L1. Configuration II): The or each step S of the optical laminate structure L3 has the same configuration as Configuration II) of the or each step S of the optical laminate structure L1.

Configuration III): The at least one step S on the second layer 100b of the optical laminate structure L3 includes first electrodes 111b, second electrodes 112b, and an insulating layer 113b. The first electrodes 111b are so arranged on the bonding face 101b of the second layer 100b as to extend in the X-X' direction in spaced relation to each other in the Y-Y' direction. The insulating layer 113b is disposed on the bonding face 101b of the second layer 100b in such a manner as to cover the first electrodes 111b. The second electrodes 112b are so arranged on the insulating layer 113b as to extend in the Y-Y' direction in spaced relation to each other each other in the X-X' direction. Other than these, the first electrode 111b and the second electrode 112b may have the same configurations as the electrode 110c and the electrode 110b', respectively, of the optical laminate structure L2.

When the at least one step S on the second layer 100b of the optical laminate structure L3 includes steps of Configuration III) above, the second adhesive layer 300b may have a thickness (Z-Z' direction dimension) that is larger than the thickness of the second adhesive layer 300b of the optical laminate structure L1 or the optical laminate structure L2. For example, the thickness of the second adhesive layer 300b of the optical laminate structure L3 may fall within a range of 50 to 500 μm. It is of course possible that the second adhesive layer 300b of the optical laminate structure L3 has the same thickness as the second adhesive layer 300b of the optical laminate structure L1 or the optical laminate structure L2. If the first electrodes 111b or the second electrodes, i.e. the at least one step S, are ITO electrodes, the second adhesive layer 300b of the optical laminate structure L3 may be of a material that does not contain acrylic acid.

The touch sensing device T3 and the optical laminate structure L3 configured as described above have various technical features, at least ones similar to the first to fifth technical features of the touch sensing device T1 and the optical laminate structure L1.

It should be noted that the above-described touch sensing device and optical laminate structure of the invention are not limited to the embodiments and their variants described above and may be modified in any manner within the scope of the claims. Some modification examples will be described below.

The optical laminate structure of the invention may be installed is a touch sensing device as described above, but it is not limited thereto. The optical laminate structure of the invention may be any structure that allows a user to recognize visual information displayed by an image display device through the optical laminate structure. If the optical laminate structure of the invention is installed in a device other than a touch sensing device, the or each step on the bonding face of the second layer may be any one of the configurations I) and II) or may be an electrode for other device than a touch sensing device (e.g. a sensor electrode).

It should be appreciated that the touch sensing device and the optical laminate structure of the above embodiments and variants thereof are described above by way of examples only. The Z-Z' direction of the invention may be any direction as long as it is the thickness direction of the optical laminate structure and the lamination direction of the layers of the optical laminate structure. The Y-Y' direction of the invention may be any direction crossing the Z-Z' direction. The X-X' direction of the invention may be any direction crossing the Z-Z' and Y-Y' directions and being located in a different plane from the plane defined by the Z-Z' and Y-Y' directions.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

REFERENCE SIGNS LIST

T1: touch sensing device
L1: optical laminate structure
100a: first layer
101a: bonding face
100b: second layer
101b: bonding face
110b: electrode
S: step
200: retarder layer
201: first bonding face
202: second bonding face
210: protrusion 300a: first adhesive layer
300b: second adhesive layer
T2: touch sensing device
L2: optical laminate structure
100a: first layer
101a: bonding face
100b': second layer
101b': bonding face
110b': electrode
102b': bonding face
100c: third layer
101c: bonding face
110c: electrode
S: step
200: retarder layer
201: first bonding face
202: second bonding face
210: protrusion
300a: first adhesive layer
310a: protrusion
300b: second adhesive layer
300c: third adhesive layer
T3: touch sensing device
L3: optical laminate structure
100a: first layer
101a: bonding face
100b: second layer
101b: bonding face
S: step
111b: first electrode
112b: second electrode
113b: insulating layer
200: retarder layer
201: first bonding face
202: second bonding face
210: protrusion
300a: first adhesive layer
310a: protrusion
300b: second adhesive layer
D: image display device
P: polarizing plate

What is claimed is:

1. An optical laminate structure comprising:
a first layer made of a material that may cause outgassing, the first layer having a bonding face;
a second layer having a bonding face;
at least one step on the bonding face of the first layer;
a retarder layer between the first layer and the second layer, the retarder layer having a first bonding face facing the first layer and a second bonding face facing the second layer;
a first adhesive layer bonding together the bonding face of the first layer and the first bonding face of the retarder layer, the first adhesive layer having a hardness that suppresses the outgas sing in an interface between the first layer and the first adhesive layer; and
a second adhesive layer bonding together the bonding face of the second layer and the second bonding face of the retarder layer, the second adhesive layer being more flexible than the first adhesive layer,
wherein the first adhesive layer includes at least one first warpable portion, each first warpable portion of the at least one first warpable portion being in contact with a respective step of the at least one step and warped so as to protrude toward the second adhesive layer,
wherein the retarder layer includes at least one second warpable portion, each second warpable portion of the at least one second warpable portion being in contact with a respective first warpable portion of the at least one first warpable portion and warped so as to protrude toward the second adhesive layer,
wherein the second adhesive layer is distorted, yielding and conforming to the at least one second warpable portion of the retarder layer, and thereby absorbs a height of the at least one second warpable portion,
wherein the first layer has a retardation value in a range of from 0 nm to 3,000 nm, and
wherein the retarder layer has a retardation value in a range of from 3,000 nm to 30,000 nm.

2. The optical laminate structure according to claim 1, wherein the optical laminate structure has an optical transparency that allows a user to recognize visual information, displayed by an image display device, through the optical laminate structure.

3. The optical laminate structure according to claim 1, wherein at least one of the first and second bonding faces of the retarder layer is surface-treated with plasma or excimer laser beams.

4. The optical laminate structure according to claim 1, wherein the at least one step is at least one of the following I) or II):
I): a protrusion or recess in the bonding face of the first layer, or
II): a printed element on the bonding face of the first layer.

5. The optical laminate structure according to claim 1, wherein the second layer is optically isotropic.

6. The optical laminate structure according to claim 1, wherein the second layer has a slow axis aligned with a direction of a slow axis of the retarder layer or has a fast axis aligned with a direction of a fast axis of the retarder layer.

7. The optical laminate structure according to claim 1, wherein
the at least one step comprises a plurality of steps.

8. The optical laminate structure according to claim 1, wherein the second adhesive layer has a thickness that is larger than a thickness of the first adhesive layer.

9. The optical laminate structure according to claim 6, wherein the second adhesive layer has a thickness that is larger than a thickness of the first adhesive layer.

10. The optical laminate structure according to claim 1, wherein the first adhesive layer has a retardation value within a range of 0 to 50 nm.

11. The optical laminate structure according to claim 1, wherein the first adhesive layer has a slow axis aligned with a direction of a slow axis of the retarder layer, or the first adhesive layer has a fast axis aligned with a direction of a fast axis of the retarder layer.

12. The optical laminate structure according to claim 1, wherein the second adhesive layer has a retardation value within a range of 0 to 50 nm.

13. The optical laminate structure according to claim 1, wherein the second adhesive layer has a slow axis aligned with a direction of a slow axis of the retarder layer, or the second adhesive layer has a fast axis aligned with a direction of a fast axis of the retarder layer.

14. The optical laminate structure according to claim 5, wherein the second adhesive layer has a retardation value within a range of 0 to 50 nm.

15. The optical laminate structure according to claim 1, wherein the second adhesive layer has a slow axis aligned with a direction of a slow axis of the retarder layer, or the second adhesive layer has a fast axis aligned with a direction of a fast axis of the retarder layer.

16. The optical laminate structure according to claim 6, wherein the second adhesive layer has a retardation value within a range of 0 to 50 nm.

17. The optical laminate structure according to claim 6, wherein the second adhesive layer has a slow axis aligned with a direction of a slow axis of the retarder layer, or the second adhesive layer has a fast axis aligned with a direction of a fast axis of the retarder layer.

18. A touch sensing device comprising the optical laminate structure of claim 1.

19. An optical laminate structure comprising:
a first layer made of a material that may cause outgassing, the first layer having a bonding face;
a second layer having a bonding face;
at least one step on the bonding face of the first layer;
one and only one retarder layer between the first layer and the second layer, the one and only one retarder layer having a first bonding face facing the first layer and a second bonding face facing the second layer;
a first adhesive layer directly bonding together the bonding face of the first layer and the first bonding face of the one and only one retarder layer, the first adhesive layer having a hardness that suppresses the outgassing in an interface between the first layer and the first adhesive layer; and
a second adhesive layer directly bonding together the bonding face of the second layer and the second bonding face of the one and only one retarder layer, the second adhesive layer being more flexible than the first adhesive layer,
wherein the first adhesive layer includes at least one first warpable portion, each first warpable portion of the at least one first warpable portion being in contact with a respective step of the at least one step and warped so as to protrude toward the second adhesive layer,
wherein the one and only one retarder layer includes at least one second warpable portion, each second warpable portion of the at least one second warpable portion being in contact with a respective first warpable portion of the at least one first warpable portion and warped so as to protrude toward the second adhesive layer, and
wherein the second adhesive layer is distorted, yielding and conforming to the at least one second warpable portion of the retarder layer, and thereby absorbs a height of the at least one second warpable portion.

20. An optical laminate structure comprising:
a first layer made of a material that may cause outgassing, the first layer having a bonding face;
a second layer having a bonding face;
at least one step on at least one of the bonding faces of the first and second layers;
one and only one retarder layer disposed between the first layer and the second layer, the one and only one retarder layer having a first bonding face facing the first layer, and a second bonding face facing the second layer;
a first adhesive layer directly bonding together the bonding face of the first layer and the first bonding face of the one and only one retarder layer, the first adhesive layer having a hardness that suppresses the outgassing in an interface between the first layer and the first adhesive layer; and
a second adhesive layer directly bonding together the bonding face of the second layer and the second bonding face of the one and only one retarder layer, the second adhesive layer being more flexible than the first adhesive layer, the second adhesive layer having a hardness enabling the second adhesive layer to get distorted by the step and thereby absorb a height of the step.

21. The optical laminate structure according to claim 20, wherein the first layer has a retardation value in a range of from 0 nm to 3,000 nm, and
wherein the retarder layer has a retardation value in a range of from 3,000 nm to 30,000 nm.

22. The optical laminate structure according to claim 1, wherein the first adhesive layer has a storage modulus of 1 to $10 \times 10^5$ Pa (at 25° C.) or 0.5 to $5 \times 10^5$ Pa (at 80° C.), and
wherein the second adhesive layer has a storage modulus of 1 to $20 \times 10^4$ Pa (at 25° C.) or 1 to $10 \times 10^4$ Pa (at 80° C.).

23. The optical laminate structure according to claim 20, wherein the first adhesive layer has a storage modulus of 1 to $10 \times 10^5$ Pa (at 25° C.) or 0.5 to $5 \times 10^5$ Pa (at 80° C.), and
wherein the second adhesive layer has a storage modulus of 1 to $20 \times 10^4$ Pa (at 25° C.) or 1 to $10 \times 10^4$ Pa (at 80° C.).

24. The optical laminate structure according to claim 1, wherein
the optical laminate structure further includes at least one step on the bonding face of the second layer, and
the second adhesive layer is distorted, yielding and conforming to the at least one step on the bonding face of the second layer, and thereby absorbs a height of the at least one step on the bonding face of the second layer.

25. The touch sensing device according to claim 19, wherein
the at least one step includes an ITO electrode on the bonding face of the second layer, and
the second adhesive layer does not contain acrylic acid.

26. The optical laminate structure according to claim 19, wherein
the optical laminate structure further includes at least one step on the bonding face of the second layer, and
the second adhesive layer is distorted, yielding and conforming to the at least one step on the bonding face of the second layer, and thereby absorbs a height of the at least one step on the bonding face of the second layer.

* * * * *